Oct. 18, 1927.
B. V. WITT ET AL
1,645,677
ORCHARD HEATER
Filed May 3, 1926
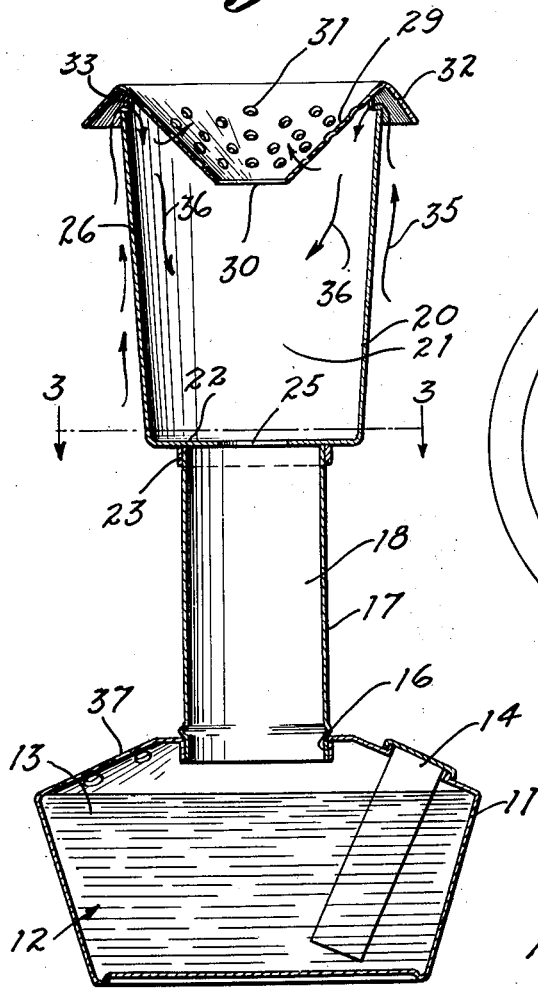
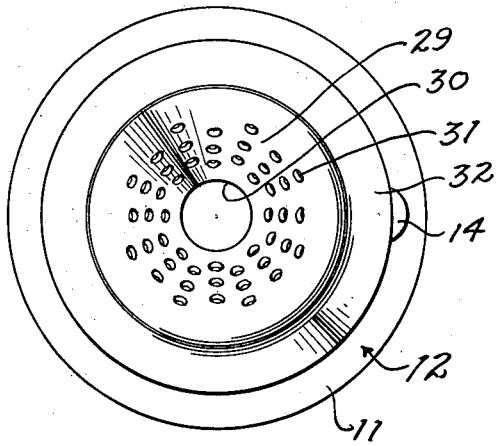
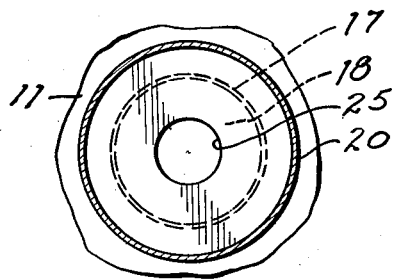
INVENTORS:
BIRDIE V. WITT,
CHARLES O. NELSON,
BY Fred Marril
ATTORNEY Patented Oct. 18, 1927.

1,645,677

UNITED STATES PATENT OFFICE.

BIRDIE V. WITT, OF PASADENA, CALIFORNIA, AND CHARLES O. NELSON, OF CHICAGO, ILLINOIS.

ORCHARD HEATER.

Application filed May 3, 1926. Serial No. 106,438.

This invention relates to the heating of orchards for protection against frosts, and it relates particularly to a novel orchard heater.

In certain orchard districts, particularly citrus fruit orchard districts, it is necessary to artificially heat the orchards in order to protect them from frost. For this purpose it is customary to use a smudge pot or orchard heater.

The ordinary form of orchard heater is not highly effective due to the fact that it does not diffuse the heat but tends to send it upward so that all of the heat is not utilized.

It is an object of this invention to provide an orchard heater which diffuses the heat and is therefore very effective.

We have found that the efficiency of an orchard heater is increased if the air, which is utilized as a combustion supporting gas, is preheated before it is mixed with the combustible gas.

It is therefore another object of this invention to provide an orchard heater in which the air utilized as a combustion supporting gas is preheated before it is mixed with the combustible gas.

It is a still further object of this invention to provide an orchard heater in which the combustion is very thorough and therefore the orchard heater is economical.

Experience has taught that the fuel used in orchard heaters, which is generally crude oil, is detrimentally affected if it is heated over an extensive period of time by heat radiating from the combustion chamber. This is ordinarily termed "baking" of the fuel, which baking detracts from its gasifying properties and causes a residue, demanding that the reservoir of the orchard heater be cleaned frequently.

It is one of the objects of this invention to provide an orchard heater in which there will be no baking of the fuel.

Other objects and particular advantages of the invention will be made manifest hereinafter.

Referring to the drawing in which we illustrate a preferred form of this invention, Fig. 1 is a vertical section through the invention.

Fig. 2 is a plan view thereof.

Fig. 3 is a section taken on the line 3—3 of Fig. 1.

The form of the invention shown in the drawing has a body 11 which provides a fuel reservoir 12 in which is placed fuel in the form of crude oil indicated at 13. A standard form of priming device, indicated by the numeral 14, is provided for causing the fuel to gasify when the orchard heater is put into operation. The body 11 has a cylindrical opening 16 formed in the upper part thereof, into which the lower end of a tube 17 extends. This tube 17 provides a gas-receiving chamber 18 which is communicated with the upper part of the reservoir 12. Placed above the tube 17 is a housing 20 which provides a combustion chamber 21. A lower wall 22 of the housing 20 engages the upper end of the tube 17 and a band 23 of the housing 20 surrounds the upper end of the tube 17, as best shown in Fig. 1. The lower wall 22 has an opening therein which forms a throat 25 which connects the gas-receiving chamber 18 to the combustion chamber 21. The throat 25 is of smaller diameter than the diameter of the tube 17 and therefore serves as a throttle or restriction for a flow of gas from the gas-receiving chamber 17. The housing 20 has a frusto-conical side wall 26, at the upper end of which is supported a suppression member 29 which is an inverted frusto cone. The suppression member 29 has a central outlet opening 30 and has a multiplicity of small passages 31 which surround the outlet 30. Extending outward at the upper part of the housing 20 is an apron 32 which projects downward and outward, as shown best in Fig. 1. This apron 32 is preferably formed integral with the suppression member 29, although if desired it may be made a separate part. The upper end of the frusto-conical wall 26 of the housing 20 is provided with inlet openings 33 which are formed immediately below the apron 32.

The operation of the invention is as follows:

In setting the orchard heater into operation the fuel 13 must first be placed in the reservoir 12, whereafter the priming device 14 is employed for heating the oil to cause the initial gasification of the fuel. As the gas forms, it passes into the gas-receiving chamber 17 and from thence it passes into the combustion chamber 21. After sufficient gas is formed to support a flame, the gas which is passed into the combustion chamber 21 may be lighted.

Air which mixes with the gas in order to provide a combustible mixture flows into the combustion chamber through the inlets 33. When the device is in operation, the housing 20 becomes heated and the air immediately surrounding the housing becomes heated and will therefore move upward as indicated by the arrows 35 of Fig. 1. When the heated air reaches the upper end of the wall 26 of the housing 20, it is guided by the apron 32 through the inlets 33 into the upper outer part of the combustion chamber 21. The heated air is guided downward by the suppression member 29 to the central and lower parts of the combustion chamber 21, as indicated by the arrows 36 of Fig. 1. This heated air, traveling as indicated by the arrow 36, is brought into association with gas flowing through the throat 25 and is intimately mixed therewith, thus providing a combustible mixture which is ignited in the combustion chamber 21.

An important part of the invention is the gas-receiving chamber 18 taken in connection with the throat 25. The gas as it is formed passes from the upper part of the reservoir 12 into the gas-receiving chamber 18. There are small openings 37 formed in the upper part of the body 11 for assisting in establishing a flow of this gas. The throat 25 has the function of throttling or restricting the flow of gas into the combustion chamber 21. This is very important, due to the fact that it prevents the gas from flowing too quickly through the combustion chamber without being thoroughly ignited; and it is also important since the products of combustion passing from the top of the orchard heater do not pass rapidly upward, but since they are moving slowly they have ample time to diffuse so that the heat is thoroughly utilized. The suppression member 29 is important to the invention since it tends to suppress the combustion mixture in the combustion chamber 21 so that a thorough combustion will take place. The gases of combustion pass from the combustion chamber 21 through the outlet opening 30. A portion of the heated air which passes into the upper end of the combustion chamber 21 through the inlets 33 may pass through the small passages 31 of the suppression member 29. This portion of the air will mix with the gases of combustion which pass through the outlet 30, and in event that there should be any gas which has not ignited the air will mix with it, thus forming a combustible mixture which will burn immediately and thus be utilized.

The drawing of the heated air into the combustion chamber 21 is also of great importance to the invention. As will be obvious from an inspection of Fig. 1, there is a siphoning effect produced which causes the air to flow upward along the outside of the frusto-conical wall 26 of the housing 20 into the upper end of the combustion chamber 21 and to the central and lower parts thereof, where it is mixed with the gas. The apron 32 is important since it prevents the heated air from passing upward beyond the upper end of the housing 20, causing it to flow through the inlets 33.

Another very important part of the invention is illustrated in Fig. 1 and consists of the placing of the combustion chamber 21 a material distance from the reservoir 12. This prevents the fuel 13 from being excessively heated and baked. As previously pointed out, baking destroys the vaporizing properties of the oil and causes a residue to form. In our invention there will be no baking of fuel and therefore no residue will form which would have to be removed.

There is practically no smoke produced by our invention, which is a distinct advantage. The reason for this is that the combustion is so thorough that a maximum of the fuel is burned. The thorough combustion also conduces to economy because more heat is derived from a given amount of oil.

A further important part of the invention is that the construction is very simple and may therefore be cheaply manufactured. The parts are so formed that they may be dismantled and nested for shipment. For example, the housing 20, since the wall 26 is frusto-conical, may be nested, and likewise the suppression members and aprons 32 which are integral may be nested for shipment.

We claim as our invention:

1. In an orchard heater the combination of: walls forming a fuel reservoir; walls forming a passageway for gas leading upwardly from said reservoir; a wall disposed across the upper end of said passageway and having an opening therein to form a restricted throat; walls forming a combustion chamber disposed above said throat so that said throat communicates therewith; a frusto-conical gas-mixing plate having a central opening and inverted in the upper portion of said combustion chamber, there being means for introducing air into said combustion chamber substantially between the walls thereof and said plate.

2. In an orchard heater the combination of: walls forming a fuel reservoir; walls forming a passageway for gas leading upwardly from said reservoir; a wall disposed across the upper end of said passageway and having an opening therein to form a restricted throat; walls forming a combustion chamber disposed above said throat so that said throat communicates therewith; said walls being substantially imperforate in the lower portion thereof; a frusto-conical gas-mixing plate having a central opening and inverted in the upper portion of said combustion chamber, there being means for introducing air into said combustion chamber substantially between the walls thereof and said plate.

3. In an orchard heater the combination of: walls forming a fuel reservoir; walls forming a passageway for gas leading upwardly from said reservoir; a wall disposed across the upper end of said passageway and having an opening therein to form a restricted throat; walls forming a combustion chamber disposed above said throat so that said throat communicates therewith; a frusto-conical gas-mixing plate having a central opening and perforations disposed thereabout, said plate being inverted in the upper portion of said combustion chamber, there being means for introducing air into said combustion chamber substantially between the walls thereof and said plate.

4. In an orchard heater the combination of: walls forming a fuel reservoir; walls forming a passageway for gas leading upwardly from said reservoir; a wall disposed across the upper end of said passageway and having an opening therein to form a restricted throat; walls forming a combustion chamber disposed above said throat so that said throat communicates therewith, said walls being substantially imperforate in the lower portion thereof; a frusto-conical gas mixing plate having a central opening and perforations disposed thereabout, said plate being inverted in the upper portion of said combustion chamber, there being means for introducing air into said combustion chamber substantially between the walls thereof and said plate.

5. In an orchard heater the combination of: walls forming a combustion chamber; means for introducing a combustible gas into a lower portion of said chamber; and a conical gas mixing plate having an opening in a central portion thereof and perforations disposed about said opening, said plate being inverted in the upper portion of said chamber in a manner to position said perforations in said combustion chamber, there being means for introducing air into said combustion chamber substantially between the walls thereof and said plate.

6. In an orchard heater the combination of: walls forming a combustion chamber; means for introducing a combustible gas into a lower portion of said chamber; a perforated gas-mixing plate disposed over the upper end of said combustion chamber, there being openings in said walls for introducing air into the upper portion of said combustion chamber so that said air mixes with said gas in the vicinity of said plate and burns, the products of combustion passing through the perforations of said plate; and an apron formed upon the edge portion of said plate to extend downwardly to guide rising air currents into said wall openings.

7. In an orchard heater the combination of: walls forming a combustion chamber; means for introducing a combustible gas into a lower portion of said chamber; a conical, perforated gas-mixing plate disposed in inverted position over the upper end of said combustion chamber, there being openings in said walls for introducing air into the upper portion of said combustion chamber so that said air mixes with said gas in the vicinity of said plate and burns, the products of combustion passing through the perforations of said plate; and an apron formed upon the edge portion of said plate to extend downwardly to guide rising air currents into said wall openings.

In testimony whereof, we have hereunto set our hands at Los Angeles, California, this 28th day of April, 1926.

BIRDIE V. WITT.
CHARLES O. NELSON.